(12) United States Patent
Pendlebury et al.

(10) Patent No.: US 8,410,908 B2
(45) Date of Patent: Apr. 2, 2013

(54) METHOD AND DEVICE FOR EMULATING MULTIPLE RFID TAGS WITHIN A SINGLE MOBILE ELECTRONIC DEVICE

(75) Inventors: Joe Pendlebury, Bayern (DE); Graham Rowse, Farnborough (GB)

(73) Assignee: Nokia Corporation

( * ) Notice: Subject to any disclaimer, the term of this patent is extended or adjusted under 35 U.S.C. 154(b) by 813 days.

(21) Appl. No.: 12/159,172

(22) PCT Filed: Dec. 30, 2005

(86) PCT No.: PCT/IB2005/003909
§ 371 (c)(1),
(2), (4) Date: Sep. 5, 2008

(87) PCT Pub. No.: WO2007/077471
PCT Pub. Date: Jul. 12, 2007

(65) Prior Publication Data
US 2009/0243810 A1 Oct. 1, 2009

(51) Int. Cl.
*H04Q 5/22* (2006.01)
(52) U.S. Cl. ..................... 340/10.4; 340/10.1
(58) Field of Classification Search ............... 340/10.1, 340/10.4, 10.2, 825.22, 572.1; 235/382; 707/10
See application file for complete search history.

(56) References Cited

U.S. PATENT DOCUMENTS

| | | | |
|---|---|---|---|
| 6,677,852 B1 * | 1/2004 | Landt | 340/10.1 |
| 6,853,294 B1 * | 2/2005 | Ramamurthy et al. | 340/10.1 |
| 7,384,003 B1 * | 6/2008 | Boyer et al. | 235/494 |

(Continued)

FOREIGN PATENT DOCUMENTS

| | | |
|---|---|---|
| EP | 1 111 557 A2 | 6/2001 |
| EP | 1 365 362 A1 | 11/2003 |

(Continued)

OTHER PUBLICATIONS

Supplementary European Search Report issued in connection with corresponding European Patent Application No. EP 05 850 721 completed Feb. 5, 2009.

(Continued)

*Primary Examiner* — Hai Phan
*Assistant Examiner* — Kaleria Knox
(74) *Attorney, Agent, or Firm* — Alston & Bird LLP (57) ABSTRACT

The present invention provides a method for emulating multiple RFID tags for an RFID tag interrogation device, comprising the steps of storing one or more data sets, wherein each data set defines operational properties of an RFID tag, maintaining a list of said one or more data sets, indicating one data set in said list as active data set, receiving an interrogation from said RFID tag interrogation device, emulating, responsive to said interrogation, the operation of the RFID tag according to the active data set; and indicating another data set in said list as active data set. Also provided is a device for emulating multiple RFID tags for an RFID tag interrogation device, comprising a circuit configurable to emulate the operation of an RFID tag, a memory adapted for storing one or more data sets and a list of said one or more data sets, wherein each data set defines operational properties of an RFID tag, and wherein one data set in said list is indicated as active data set, a controller connected with said circuit and said memory, wherein said controller is adapted for being activated by an interrogation from said RFID tag interrogation device, for configuring said circuit according to said active data set, and for indicating another data set within said list as active data set. Furthermore a mobile electronic device comprising this device is provided.

30 Claims, 4 Drawing Sheets

U.S. PATENT DOCUMENTS

| | | | | |
|---|---|---|---|---|
| 7,446,646 B2 * | 11/2008 | Huomo | ............... | 340/10.1 |
| 2004/0262384 A1 * | 12/2004 | Nishida et al. | ............... | 235/382 |
| 2004/0263319 A1 | 12/2004 | Huomo | | |
| 2005/0116050 A1 | 6/2005 | Jei et al. | | |

FOREIGN PATENT DOCUMENTS

| | | |
|---|---|---|
| EP | 1 424 657 A1 | 6/2004 |
| EP | 1 478 152 A2 | 11/2004 |
| GB | 2 413 246 | 10/2005 |
| JP | 2003-76958 A | 3/2003 |
| JP | 2004-334316 A | 11/2004 |
| WO | WO 2004/114239 A2 | 12/2004 |

OTHER PUBLICATIONS

International Search Report for International Application No. PCT/IB2005/003909.

Written Opinion of the International Searching Authority for International Application No. PCT/IB2005/003909

Office Action for Japanese Application No. 2008-548035 dated Jun. 28, 2011.

Notice of Reasons for Rejection for Japanese Patent Application No. 2008-548035, dated Feb. 21, 2012.

* cited by examiner

METHOD AND DEVICE FOR EMULATING MULTIPLE RFID TAGS WITHIN A SINGLE MOBILE ELECTRONIC DEVICE

The present invention relates to a method and a device for emulating multiple RFID tags in a single mobile electronic device. It particularly relates to the emulation of multiple RFID tags when said mobile electronic device is powered down or powerless due to an exhausted energy supply.

So-called RFID (radio frequency identification) tags are transponder units used e.g. in labeling goods, wirelessly readable smart cards and the like. RFID tags may for example represent a railway ticket, a theatre ticket or a discount voucher.

An RFID tag stores information that can be read/written by an RFID tag interrogation device, or RFID tag reader/writer device, respectively. Such tags have to be available in all situations, as they may represent the above mentioned items which are necessary to a user, as railway or other transportation tickets or access control information for gaining access to offices and the like. That is, RFID tags may be used for replacing conventional paper tickets/passports or physical keys.

A mobile electronic device can emulate the operation of an RFID tag using a suitable electronic circuit and corresponding antenna. This electronic circuit may be integrated into or be part of the circuitry of the mobile device itself. In these cases the circuitry of the mobile device provides the RFID functionality. The mobile electronic device can "store" multiple RFID tags, that is, store the data required to emulate such RFID tags. The emulation data comprises data defining the air interface properties, like operating frequency, modulation, protocol and the like, and data defining the actual data payload of the RFID tag. The data describing the RFID tag can then be made available to an RFID tag interrogation device through an RFID circuit and corresponding antenna.

Mobile electronic devices, however, are powered by energy supplies or batteries with a rather limited capacity. Under certain circumstances it is also likely to occur that such a mobile electronic device is simply shut down, e.g. while visiting an office building wherein the use of mobile phones with cameras is prohibited.

As already mentioned, RFID tags have to function exactly as their conventional counterparts, that is, tickets, keys or the like, in order to be accepted by users. A conventional paper ticket or key, however, is naturally not subjected to power failures. Therefore the RFID tags have to be available even when the mobile electronic device is either powered down by purpose or when its energy supply is exhausted, e.g. by a long telephone call.

In order to be able to "store" multiple RFID tags within a mobile electronic device, that is, the data required to emulate such tags, such a mobile electronic device comprises a circuit that is configurable for emulating RFID tags. "Emulating" in the context of this invention means that the circuit is configured such that it behaves like the respective RFID tag. It will thus provide an air interface identical or at least compatible thereto, with respect to parameters like frequency, modulation, data rate and the like. Further it will also be enabled to transmit the same data payload, that is, data content as the RFID tag in question. Upon being interrogated by an RFID tag interrogation device ("tag reader") the circuit will therefore behave exactly as the RFID tag to be emulated.

The circuit responsible for presenting such tags, however, does not comprise any intelligent logic itself that would enable it to select which one of a plurality of "stored" RFID tags should be presented if an interrogation occurs. This selection, that is, the "loading" of the RFID tag data into the circuit for configuration, can be handled by the processor of the mobile electronic device. However, in that case the above mentioned problems will arise. If the mobile electronic device is without power, the selection could not be made. This will at best result in the circuit staying configured to the last RFID tag it had emulated.

Without providing power to the mobile electronic device again the user is thus not able to access any other RFID tag stored within his device. If the device is shut down on purpose this will only provide a minor discomfort to the user. Although it can be very annoying to first start the device by entering a PIN or like to be enabled to open a door or enter an office, the user is not completely lost. However, if the energy supply of the device is exhausted, the user might become stranded without access to the other tags. He might be hindered from entering (or possibly also leaving) his office or home, using a train or visiting a theatre.

As already mentioned, an important task for handling multiple RFID tags within an electronic device is the selection process. That is, the selection which one of the stored tags should be presented to a particular RFID tag interrogation device. The appropriate tag could be selected using intelligence in the software of the electronic device, e.g. by identifying properties of the signal sent by the RFID interrogation device, or could be selected by the user through a user interface thereof. However, for being able to use these approaches it is mandatory that the mobile device has power, which is not the case when the user has shut down the device by purpose, or when the energy supply of the device is exhausted.

In order to ensure operability of the stored RFID tags under all circumstances it is thus necessary to provide means for enabling a user to access all stored tags. There are two major problems associated with this object. While it is in principle possible to provide dedicated intelligence, that is, a suitable logic circuitry for performing this task, this is not preferable in conjunction with RFID tags, as it would increase the manufacturing costs in an unreasonable manner.

Another problem that may even be more important is the power supply of such an intelligent logic circuitry. Due to the issues mentioned above it is not possible to rely only on the power supply of the device such an RFID tag emulation circuit is comprised in. So-called passive RFID tags do not comprise an internal power source; they are powered completely by the electromagnetic interrogation signal. However, the energy amount that can be supplied by such an interrogation signal is quite low. A complex circuitry that would be needed to enable a selection among a plurality of stored tags can not be powered by this low energy amount.

The present invention provides a method and a device for solving the above discussed problems with the selection, presentation/emulation of RFID tags in a single mobile electronic device. With the invention a user is enabled to make use of any stored RFID tag, without being required to first start his electronic device, and also in a state where the power supply of the device is exhausted.

The present invention provides means for handling multiple RFID tags within a single mobile electronic device. In order to enable such multiple RFID tag handling an electronic circuit can be used. Such an electronic circuit can be powered by the mobile electronic device (active mode) or by the interrogation signal from the tag interrogation device (passive mode). The low power interrogation signal is not powerful enough to provide power also to the mobile electronic device.

Therefore an interface ASIC (application specific integrated circuit) can be used as a power "wall" (separator of a self-sustaining power domain) in case power can not be provided by the mobile phone. Such an interface ASIC would need to contain as little logic as possible, such that it can be powered by the current induced from the RFID interrogator.

However, current electronic circuits of this type can conventionally only cope with a single tag at a time, that is, the correct tag must be "downloaded" or programmed into the electronic circuit by the mobile electronic device before the respective tag can be used. When the mobile electronic device, e.g. a mobile phone is powered down or the battery power is exhausted the electronic circuit is thus unable to decide which of the stored RFID tags should be presented to an interrogation device, it will only be able to present the one it was last programmed with. When the phone battery is used up, maybe by a long phone call, the user is therefore unable to select which RFID tag to present. Usually the RFID tag used last will be the only one available. If for example the user has just recently used a theatre ticket RFID tag, he cannot access his railway ticket within the phone and might become stranded without access to transportation.

The main problem is that the electronic RFID emulation circuit itself is unable to choose between stored tags, as it has little intelligence built in. Such intelligence could be added to the electronic circuit by adding suitable circuitry, but this would naturally increase the costs and may increase the power requirements for the electronic circuit beyond reasonable levels. The power consumption of the electronic circuit, however, must not be higher than what can be provided by the interrogation device, as otherwise the electronic circuit can not suitably operate.

Currently, the electronic circuit can therefore only present the tag it was last provided with by the mobile phone, thus the problem of selecting other tags cannot be solved by the conventional technology without power being supplied by the mobile phone in some way.

It is therefore an object of the present invention to provide a method and a device for enabling the emulation of multiple RFID tags in a single mobile electronic device in powerless mode or powered down state of the device.

According to one aspect a method for emulating multiple RFID tags for an RFID tag interrogation device is provided. The method is to be employed with a device comprising a circuit configurable to emulate the operation of an RFID tag, and a memory. The method comprises the steps
storing one or more data sets, wherein each data set defines operational properties of an RFID tag;
maintaining a list of said one or more data sets;
indicating one data set in said list as active data set;
receiving an interrogation from said RFID tag interrogation device;
emulating, responsive to said interrogation, the operation of the RFID tag defined by the active data set; and
indicating another data set in said list as active data set.
The inventive method enables the use of and access to multiple RFID tags within a single mobile electronic device, particularly in a powerless state of the mobile device.

In an exemplary embodiment the other data set is the subsequent data set in said list. When there is only one data set present, the subsequent data set is this data set.

In an exemplary embodiment the RFID tag interrogation device comprises writing capabilities, and the method further comprises the steps
receiving a write access from said RFID tag interrogation device;
indicating, responsive to said write access, the previous data set in said list as active data set; and
modifying the active data set in accordance with said write access.

By this scheme a read-write-verify procedure is enabled, that is, that tag is written to which was previously presented. Tampering with other tags is efficiently prevented thereby.

In an exemplary embodiment the other data set is the precedent data set in said list. When there is only one data set present, the precedent data set is this data set.

In an exemplary embodiment the method further comprises
indicating a pre-determined data set in said list as active data set. When performed within a mobile electronic device like a mobile phone comprising additional processing capabilities and/or user input means, this enables either the mobile device or the user to indicate another data set as active, that is, select the data set of said list which is to be presented first, for example upon initialization of said list. The tag to be presented next to an interrogation device can so be selected, e.g. as long as the mobile device still has power, in order to speed up the RFID tag presentation procedure at next use thereof. This enables to make use of a "power down default" setting, which will be explained in conjunction with the following example embodiments of devices according to the invention.

In an exemplary embodiment, the method further comprises
re-arranging the order of the data sets in the list.
This enables to change the succession the stored RFID tags are cycled through. The list can be given a new order, based on a variety of parameters which will be explained later on. Changing the order means that the position of one or more data sets in the list is re-arranged.

In an exemplary embodiment the method further comprises
maintaining a value indicating the frequentness one or more of said data sets have been indicated as active data sets;
wherein the re-arranging is performed in accordance with the value.
As it may be likely that the most frequently used tag will provide for the highest probability that it will be the one to be presented during the next interrogation procedure, this can help to speed up the latter.

In an exemplary embodiment the method further comprises
maintaining a usage history one or more data sets have been indicated as active data sets;
wherein the re-arranging is performed in accordance with the usage history.
This enables e.g. to build up a kind of FIFO (first in first out) or LIFO (last in first out) scheme for the list to be cycled through, e.g. for also speeding up the interrogation procedure, e.g. by keeping track of which data set was last/first used and re-ordering the list accordingly In an exemplary embodiment the method further comprises
receiving a user input indicating one of the data sets; and
re-arranging the indicated data set within the list according to the user input.
The user should advantageously be given the possibility to re-arrange certain data sets within the list.

In an exemplary embodiment the method further comprises
determining a type of one or more data sets based on said operational properties defined by said data sets;
wherein the re-arranging is performed in accordance with the type.
The type of an RFID tag (read-only, writeable, single use, multiple use, air interface standard etc.) is another parameter suitable for re-arranging entries of the list.

In an exemplary embodiment the indicating of an active data set comprises storing a pointer or updating a stored pointer, respectively, wherein the pointer indicates which one is the active data set. Using a pointer, e.g. simply the number of the stored data set, is a convenient and simple way of indicating one data set as active. Updating can then be achieved by either increasing or decreasing the counter, which may also be called a counter then.

According to another aspect of the invention a computer program product is provided, comprising program code means for carrying out the method described above.

According to yet another aspect a computer program product is provided, comprising program code means stored on a computer readable medium for carrying out the method described above.

According to still another aspect a computer data signal is provided, embodied in a carrier wave and representing a program comprising program code means for carrying out the method described above.

According to a further aspect of the invention a device for emulating multiple RFID tags for an RFID tag interrogation device is provided. The device comprises a circuit configurable to emulate the operation of an RFID tag;

a memory adapted for storing one or more data sets and a list of said one or more data sets, wherein each data set defines operational properties of an RFID tag, and wherein one data set in said list is indicated as active data set;

a controller connected with said circuit and said memory; wherein said controller is adapted for being activated by an interrogation from said RFID tag interrogation device, for configuring said circuit according to said indicated data set, and for indicating another data set within said list as active data set.

This device enables to perform the above mentioned method of the present invention within a mobile electronic device. Circuit, memory and controller may be implemented by a suitable ASIC.

In an exemplary embodiment the other data set is the subsequent data set in said list.

In an exemplary embodiment the RFID tag interrogation device comprises writing capabilities, and the controller is further adapted for being activated by a write access by the RFID tag interrogation device, for indicating the previous data set in the list as active data set, and for modifying the active data set in accordance with the write access responsive to the write access activation.

In an exemplary embodiment the previous data set is the precedent data set in said list.

In an exemplary embodiment each data set is structured into a header section defining air interface properties of an RFID tag; and a body section defining the data payload of the RFID tag.

In an exemplary embodiment the controller is adapted for performing the indicating of an active data set by storing a pointer in the memory or updating a pointer stored in the memory, respectively, wherein the pointer indicates the active data set.

In an exemplary embodiment the inventive device may be implemented as an interface Application Specific Integrated Circuit (ASIC). The memory and the controller may so advantageously be integrated into a single ASIC, in order to save manufacturing costs and minimize the power consumption.

In an exemplary embodiment a device as described above is integrated into a mobile electronic device, wherein the mobile electronic device is adapted for indicating a pre-determined data set as active data set.

In an exemplary embodiment a device as described above is integrated into a mobile electronic device, wherein the mobile electronic device is adapted for re-arranging the order of said data sets in said list.

In an exemplary embodiment the mobile electronic device is adapted for maintaining a value indicating the frequentness said one or more of said data sets have been indicated as active data sets, and for performing said re-arranging in accordance with said value.

In an exemplary embodiment the mobile electronic device is adapted for one or more of said data sets have been indicated as active data sets, and for performing said re-arranging in accordance with said usage history.

In an exemplary embodiment the mobile electronic device comprises user input means adapted for receiving a user input indicating one of said data sets, and wherein said mobile electronic device is adapted for performing said re-arranging in accordance with said user input.

In an exemplary embodiment the mobile electronic device is adapted for determining a type of one or more of said data sets based on said operational properties defined by said data sets, and for performing said re-arranging in accordance with said type.

In an exemplary embodiment the mobile electronic device may have a "power down default" option. That is, a default setting can be chosen such that during power down of the mobile device a pre-determined data set is automatically indicated as active, in accordance with the default setting. That way e.g. the user can pre-set the tag to be presented first, which may help to speed up the interrogation procedure, even if the user forgot to change to the default data set prior to shutting down his device.

DETAILED DESCRIPTION OF THE INVENTION

The device of the present invention must be able to store multiple tags such that it has access to all the possible tags without having to rely on the mobile phone memory or processor. To decide which tag to present to an interrogation device a counter or pointer may be used to cycle through the available tags.

Referring to the example of a user wishing to access his railway ticket which has been mentioned in the introduction, a user may have to activate the interrogation device up to three times but the correct tag would be presented and the user will have access to his stored tags.

This arrangement, that is, simply cycling through the available tags in order to be able to access all tags, requires minimal extra processing ability and power consumption over a basic electronic circuit (e.g. interface ASIC) as all the (initial) setup can be performed by the mobile phone processor, the pointer management being the only extra administration required in the electronic circuit.

The pointer is used to indicate which of the stored tags is to be presented to an interrogation device upon interrogation of the electronic circuit. The pointer is set to refer to the next tag, making this tag the "active tag", each time the electronic circuit is activated by a read operation. In this way the tag to be presented or the active tag, respectively, is cycled through the available tags, giving access to each one in turn. Upon a write operation the pointer may be moved to the previous tag, before performing the actual writing operation, so that the tag written to is the one which was previously read. In this way a read-write-verify operation can be handled without disrupting other stored tags.

However, this depends on when the pointer increment takes place. The following exemplary embodiments are also possible with the invention. A READ+MODIFY operation may be performed with increment of the pointer/counter after completion. Or the increment is performed only after a WRITE operation was done or after it was discovered that no WRITE operation is to be performed. In those cases no "setting back" of the pointer needs to be done.

It is to be noted that the pointer must of course be non-volatile during power removal.

A list is used to locate the multiple tags within the memory. The list stores the number of available tags together with access data like the start position in memory of each tag, and the length of payload data thereof. In an embodiment, this list is used in conjunction with the pointer in order to locate the RFID tag that is to be accessed.

In embodiments wherein the tag header is stored, it may be of fixed size, and it is used to store the air interface settings required by the tag to be emulated. That is, the properties of the air interface of the respective tag to be emulated are stored within the header. These properties may include operating frequency, transmission rate, supported functionality, modulation form and other parameters associated with the air interface. The electronic circuit is thus enabled to present the tag payload data in the suitable protocol required by the interrogation device.

In this way tags of different RFID standards/protocols etc. can be accommodated within the same electronic circuit without a necessary intervention by the mobile phone. Upon activation of the electronic circuit the settings stored for the current RFID tag are used to configure the electronic circuit to adhere to the required standard.

In alternative embodiments of the invention the electronic circuit can also make use of only one RFID tag air interface format or standard. In that case the header section may even be omitted completely in the data sets, as the air interface is then pre-determined by the fixed used standard. As there are a number of standards available it will, however, be advantageous to be able to adapt to different standards within in one device.

The length of data stored for that tag and the maximum length of the data is also stored in the tag header. A small amount of free space can be allocated at the end of data payload section to allow for expansion of the tag data by a write access from a writing-capable interrogation device.

The mobile phone can select the default tag to be presented by setting the pointer to refer to the appropriate data set as long as the mobile phone is powered.

Allowing a user to store multiple tags within an ASIC comprises the possibility of storing multiple copies of the same tag within the interface ASIC. This could cause a security problem when a monetary value is attached to the tag, e.g., multiple copies of a railway ticket which is never invalidated by an interrogation device.

To address this issue the mobile phone must verify that all the tags stored within the device are unique. However, a solution for this problem is simple and cheap, and fits in with existing RFID schemes.

Figure 1:
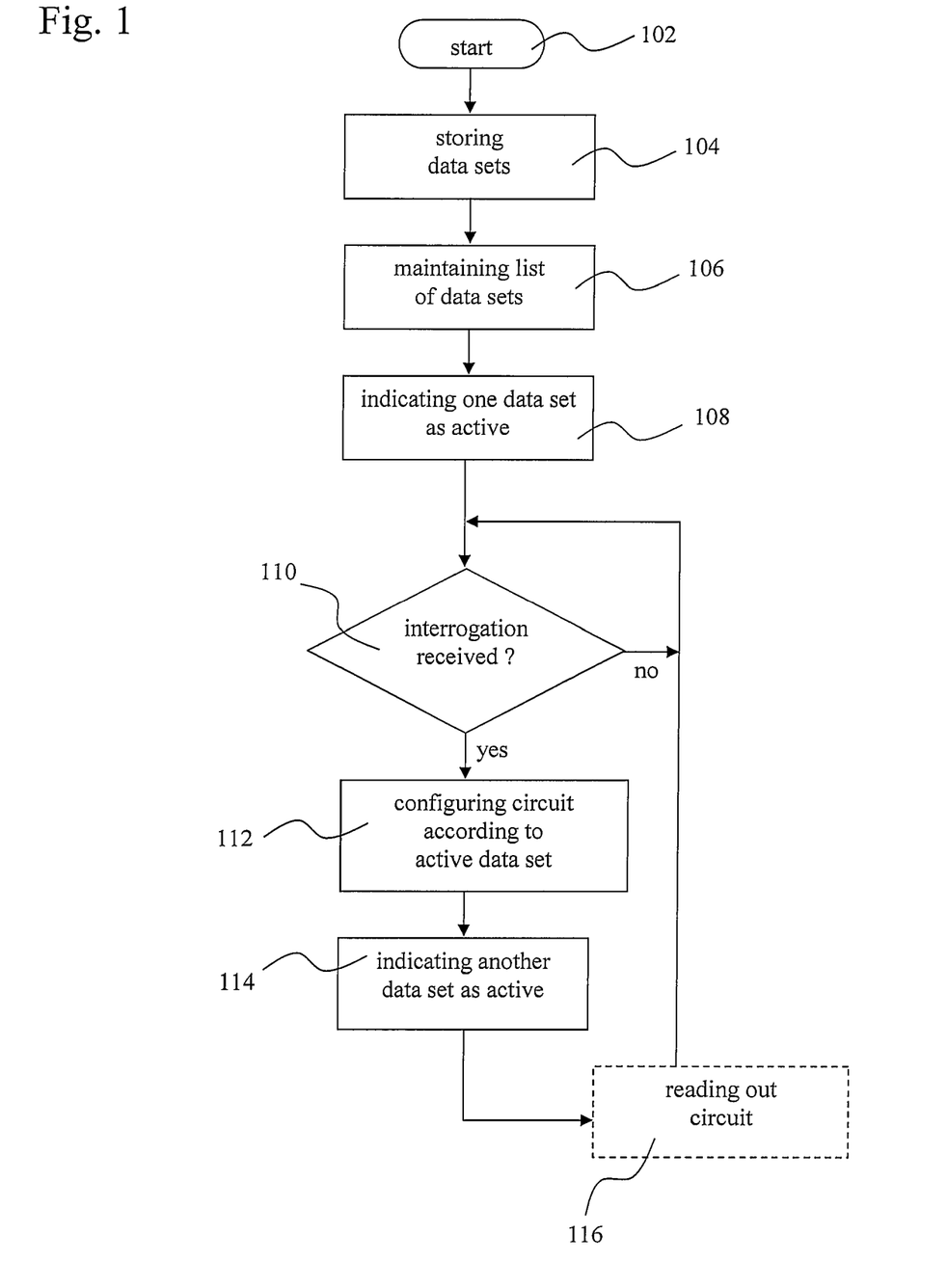
FIG. 1 shows a flow diagram of an embodiment of the method according to the invention.

In FIG. 1 a basic embodiment of the method of the present invention is depicted. After starting in step 102 one ore more data sets are stored within a memory in step 104, a list of the data sets is maintained (initially built and later on updated accordingly) in step 106 and one of the data sets is indicated as active (step 108). All of these data sets define the operational properties of RFID tags, which is illustrated in more detail in FIG. 3. The term "operational properties" of an RFID tag is to be understood, in the context of the present invention, as representing all parameters necessary for emulating the behavior of the RFID tag in question.

Depending on the actual implementation of the corresponding electronic circuit, this will usually include all air interface properties (frequency, modulation pattern etc.), however in alternative embodiments the operational properties may be reduced to the actual payload, if the air interface is fixed to one format/standard, as mentioned earlier.

Preferably, these properties include two main sections. A first data section is related to the air interface of the RFID tag. That is, parameters like operating frequency, modulation form, protocol used and the like are defined by this section. The second section is related to the data content of the tag itself, that is, the data payload thereof. As already mentioned there are various uses for RFID tags. Depending on the specific application of a particular RFID tag the payload may comprise identification data for identifying a certain person, e.g. for access control, or data representing a railway or theatre ticket, or other known RFID tag contents.

In case the respective tag is also writable, that is, its data content can be altered by a writing capable interrogation device, there may also be provided a reserved free section. This provides for a certain amount of additional data that can be written to the respective tag. Or in other words, the reserved free space determines how much data may be added to a certain tag.

The list of the data sets comprises a plurality of entries, each being associated with one of the stored RFID tags. Each entry contains at least a unique identifier, which may be a number, a starting position within the memory and a length of the respective data set. Optionally also a maximum allowed length for the tag payload data can be included. The latter relates to tags that are writeable, and wherein the payload data are not to exceed a predefined total length within the memory. The list of data sets is an ordered list, that is, the entries are arranged in a successive manner. In certain embodiments, this is required to enable the inventive device to re-set the pointer referring to one data set entry within the list without having to implement too complex logic for choosing which entry is the "subsequent" or "preceding" entry.

The invention does also work with only a single stored RFID tag, for example when currently only one RFID is stored, although there will usually be more than one. However, there may be situations where currently only one tag is present. In the situation where only one data set is present, the terms "subsequent" or "precedent" are to be understood as referring to that same data set.

In step 110 an interrogation by an RFID tag interrogation device is received (this step is looped or repeated until an interrogation occurs). That is, the circuit of the inventive device is being activated or powered by the interrogation signal. Upon being interrogated the circuit is (re-)configured (step 112) according to the data set that is indicated as active, e.g. in one embodiment referred to by a pointer. The circuit is now ready to emulate the respective tag defined by the active data set.

In step 114 another data set is indicated as active, e.g. the pointer is now set forth. "Another" will, in the context of the present invention, usually mean the data set that is the subsequent data set within the list. However the data set which is indicated as active can, in other embodiments, also be chosen in a different manner, e.g. by tag type, frequentness of tag use, tag usage history (FIFO, LIFO order) etc.

It is to be noted that "subsequent"/"preceding" only refer to the direction in which the list is processed. This is not to be understood as restricting the present invention. For example, if the above mentioned indicators of data sets are numbers (1, 2, 3, . . . ) or possibly letters (a, b, c, . . . ) the list can either be processed in descending order (1→2→3→ . . . /a→b→c→ . . . ) or in ascending order. The indicators are preferably as short as possible. This is required to minimize the administration effort when (re-)setting the pointer.

In step 116 the configured circuit is read out by the RFID tag interrogation device, shown in dashed lines. This step can also occur between steps 112 and 114, or together with step 110. As this step 116 is not part of this invention itself it is shown in dashed lines here.

The process can then return to step 110 and be continued. That will usually mean that the mobile electronic device comprising the inventive device is removed from the operational range of the RFID tag interrogation device. If the desired tag has already been presented until now, the process can be concluded here. However, if the tag was not the one the user wanted to present, the user has to cycle through the method steps 110 to 116 again at least once. Even in the worst case the user has to repeat the procedure only as many times as there are tags stored in his mobile electronic device, e.g. five times in case of five different RFID tags.

It is also to be noted that the previous and following description will mainly focus on an embodiment where a list and a pointer referring to the active data set will be used in maintaining the list. However, the invention is not limited to this exemplary embodiment, the active data set can be marked also by other means, e.g. by an "active" flag in each data set header or like.

While the above described embodiment according to the method of the invention is also useful in cases where the mobile electronic device has been shut down on purpose, the invention is particularly advantageous when the mobile device is powerless due to insufficient batteries, and the user is thus unable to provide it with power. Instead of getting stuck without access to important RFID tags as with the conventional technology, he is able to perform a kind of "emergency" tag read-out procedure by introducing his mobile device to an RFID tag interrogation device as many times as required. Under all circumstances he will be able to finally present the "right" RFID tag.

Figure 2:
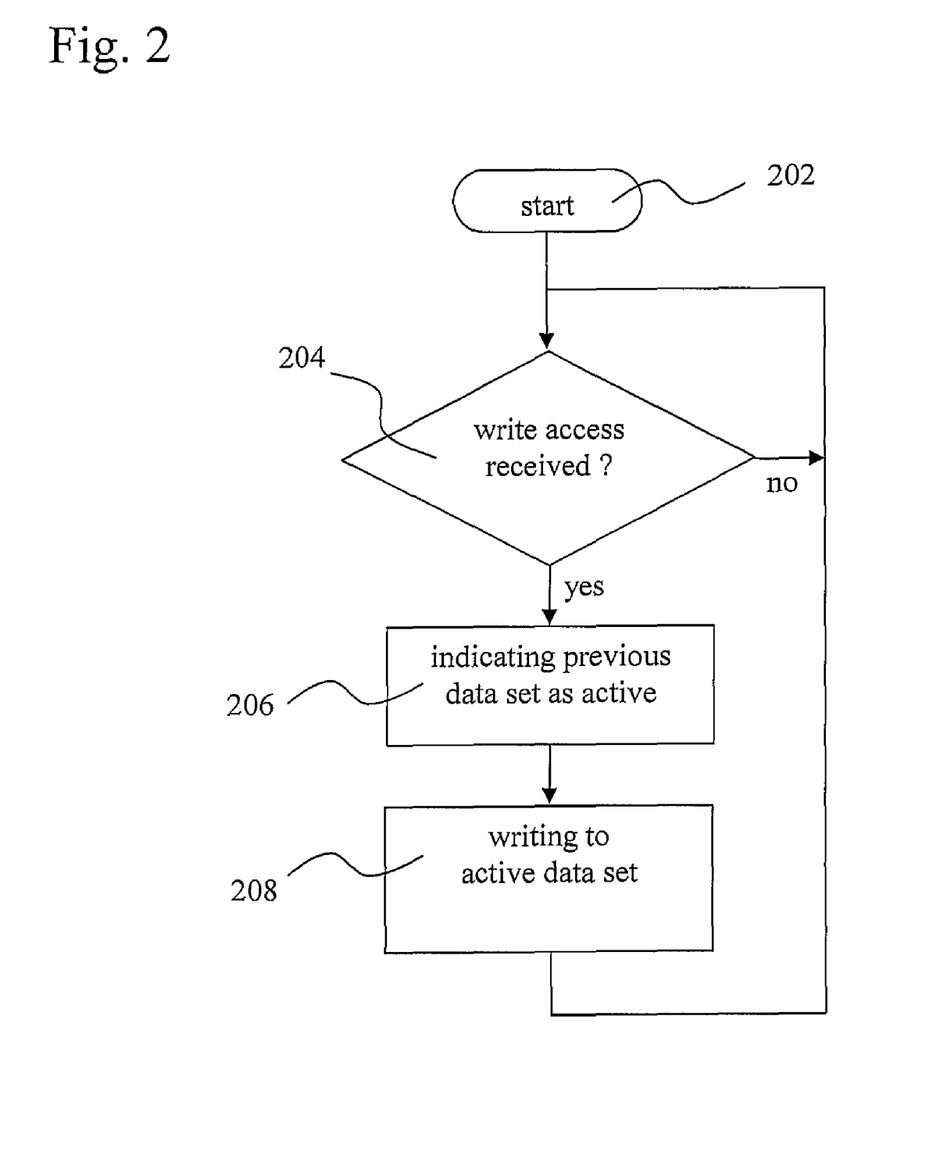
FIG. 2 shows a flow diagram of another embodiment of the method according to the invention.

FIG. 2 shows a variation according to an advanced embodiment of the inventive method. The procedure starts in step 202, and it is assumed here that the preliminary step 104 according to FIG. 1 has already been performed. Although this is not necessary for this embodiment to work, the complete procedure according to FIG. 1 may already have been performed. In step 204 a write access is received from a writing capable RFID tag interrogation device (or this step is repeated until such write access occurred). In step 206 the previously active data set is indicated as active, e.g. the pointer is set back, that is, set to refer to the preceding data set in the list. It is to be noted that this particular succession is required. As the present invention is the most useful in cases where the mobile electronic device in question is without power, the user is unable to recognize which tag is currently used to configure the emulation circuit, e.g. through the display of the mobile device.

While this is irrelevant with pure read access, it may be very relevant for write accesses. It should be apparent that any write access to the wrong tag is to be prevented. There are known techniques for avoiding that a tag is accidentally overwritten with false content, like the use of session IDs and the like. These techniques are per se known and shall therefore not be detailed further herein. However, the user should be provided with a possibility to recognize which tag is written to. Therefore the invention uses the described succession, in order to enable a read-write-verify procedure. For example in case of a railway ticket comprising a monetary value corresponding to three rides the user would first cycle through the tags until the railway RFID tag shows up.

This should be indicated by the tag interrogation device, a teller machine or like, probably comprising a display. The interrogation device could now present the user a choice like "debit current ride from tag?". Upon acknowledgment by the user the teller machine or like could now re-write the corresponding tag content. Finally, the user can use the interrogation device again, by simply presenting his mobile device again, for verifying that the debit procedure has been performed correctly. For all read accesses the method as described in conjunction with FIG. 1 can be used.

However, it is to be noted that this depends on when the pointer increment takes place. As mentioned earlier the following examples could also be possible: a READ+MODIFY with increment at the end. Or the increment takes only place after a WRITE was done or after it was discovered that no WRITE needs to be done. In those cases no "setting back" of the pointer needs to be done.

Figure 3:
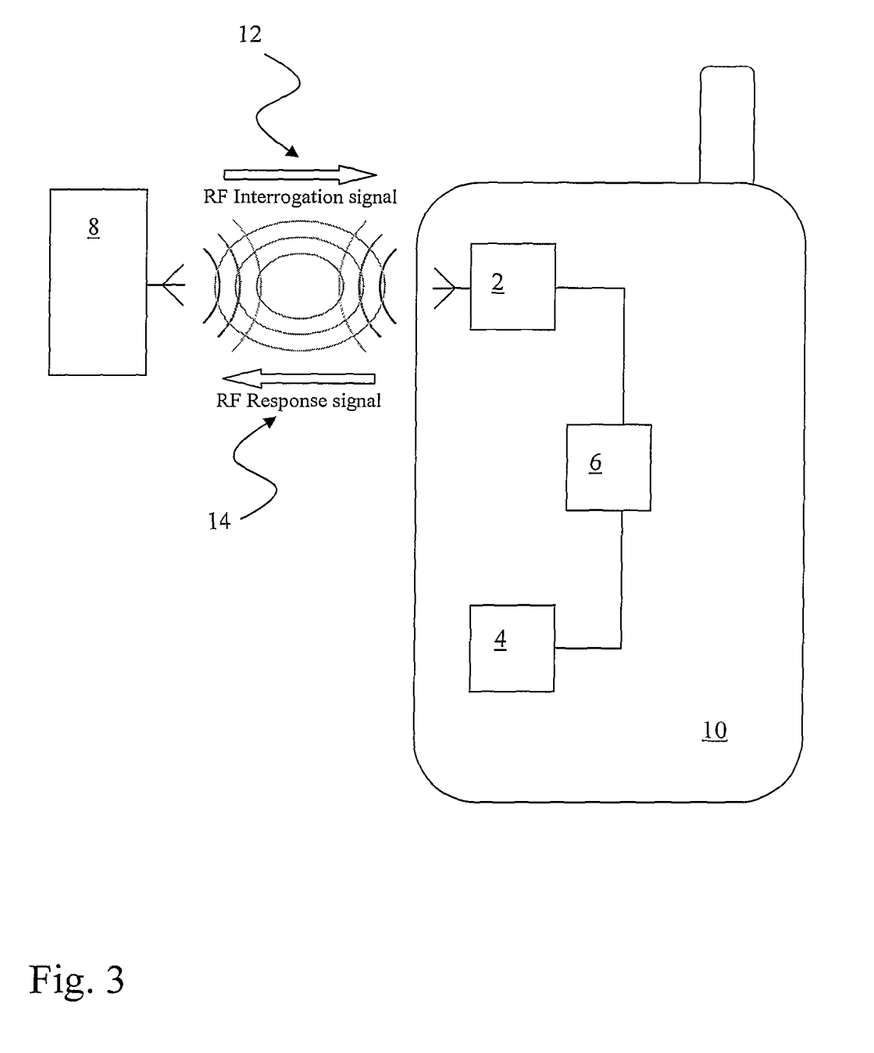
FIG. 3 shows a schematic view of an embodiment of the device according to the invention.

FIG. 3 is a schematic diagram of a mobile electronic device comprising the inventive multiple tag emulation device. The mobile electronic device is depicted here as a mobile phone 10, however, the invention may as well be applied to any other mobile electronic device like an mp3 player, a smartphone, PDA, notebook computer or like. A circuit 2 is provided, which may be configured to emulate the behavior of a certain RFID tag. Such circuit can be implemented as an application specific circuit ASIC.

A memory 4 is provided for storing at least two data sets, wherein each data set defines the properties of an RFID tag. As has been described before, this refers to the air interface parameters as well as the actual data payload of such an RFID tag. A controller 6 is connected with the memory 4 and the circuit 2. The contents of the memory 4 have already been described earlier; for a more detailed description see also FIG. 4. The controller 6 is adapted for being provided power by said circuit 2, upon an interrogation procedure by an RFID tag interrogation device 8. The RFID interrogation signal 12 will then activate the circuit 2, enabling it to power also the controller 6.

Preferably the inventive device is implemented as an Application Specific Integrated Circuit (ASIC), and the memory and controller are integrated into the ASIC, which is advantageous with respect to costs and power saving.

As already described in conjunction with the inventive method the controller 6 will, upon an interrogation, configure the circuit 2 according to one of the stored RFID tags in memory 4. In order to perform this action the controller 6 has to read the pointer stored in the memory 4, which refers to one of the data sets in the memory 4. The controller 6 is thus enabled to access the respective data set, in order to use the properties defined by the data set to configure the circuit 2.

When the circuit is (re-)configured according to the data set in question, an RF response signal 14 will be generated and emitted to the RFID tag interrogation device 8. Depending on the actual type of response signal 14, which depends on the properties defined by the data set, the RFID tag interrogation device 8 will accept the response or not. The RFID tag interrogation device 8 may e.g. be some access control device, wherein the appropriate response will function as a key.

The controller 6 is further adapted to re-set the pointer in memory 4 to the subsequent entry within the list of data sets. If the response signal 14 was not the appropriate one, this enables the user of the mobile device to remove it from the RFID tag interrogation device 8, and to introduce it thereto again. The device 10 comprising the inventive RFID tag emulation device can so be used to present all stored tags, without relying on an internal power source.

In advanced embodiments (not shown), the mobile device 10 can also comprise an internal power source, a central processor, a display and user input means. With these conventional means, which shall therefore not be described in detail here, the user and/or the mobile device are enabled to manipulate both the pointer as well as the list of data sets. For example the mobile device could keep track of the frequentness a certain stored RFID tag is used, and re-arrange the position of the corresponding data set within the list, or at least re-set the pointer to refer to that particular data set.

In this manner the chances would be improved that the first RFID tag the emulation circuit 2 has been configured to emulate is the one required when the user introduces his mobile device to an interrogation device the next time. The list, which is an ordered list of stored RFID tags or their properties, respectively, can be re-ordered/re-arranged according to such parameters as the frequentness a certain tag is used. Other parameters to be used for this re-arranging include a usage history of the tags, that is, which one was used first/last, or also the type of certain RFID tag (read-only, writable, size of data content/payload, standard of air interface etc.). That is, any parameter that can be used to re-set the pointer and/or re-arrange the list in order to improve the chances the most probable RFID tags are emulated first, can be used in this context. For example FIFO (first in first out) or LIFO (last in first out) schemes can be implemented.

In an embodiment of the present invention it is also possible to provide the user with means for manually re-setting the pointer and/or re-arranging the succession of data sets. Depending on the complexity of the user interface of the respective mobile device there are many possibilities to achieve this. In a most simple way, the user could indicate one of the data sets, and the mobile device would then move up/down this data set one position, put it at either end of the list, or set the pointer to refer to that data set. Other possible ways of achieving such list arranging/re-setting of the pointer should be apparent to an artisan, and are included within the scope of this invention.

Figure 4:
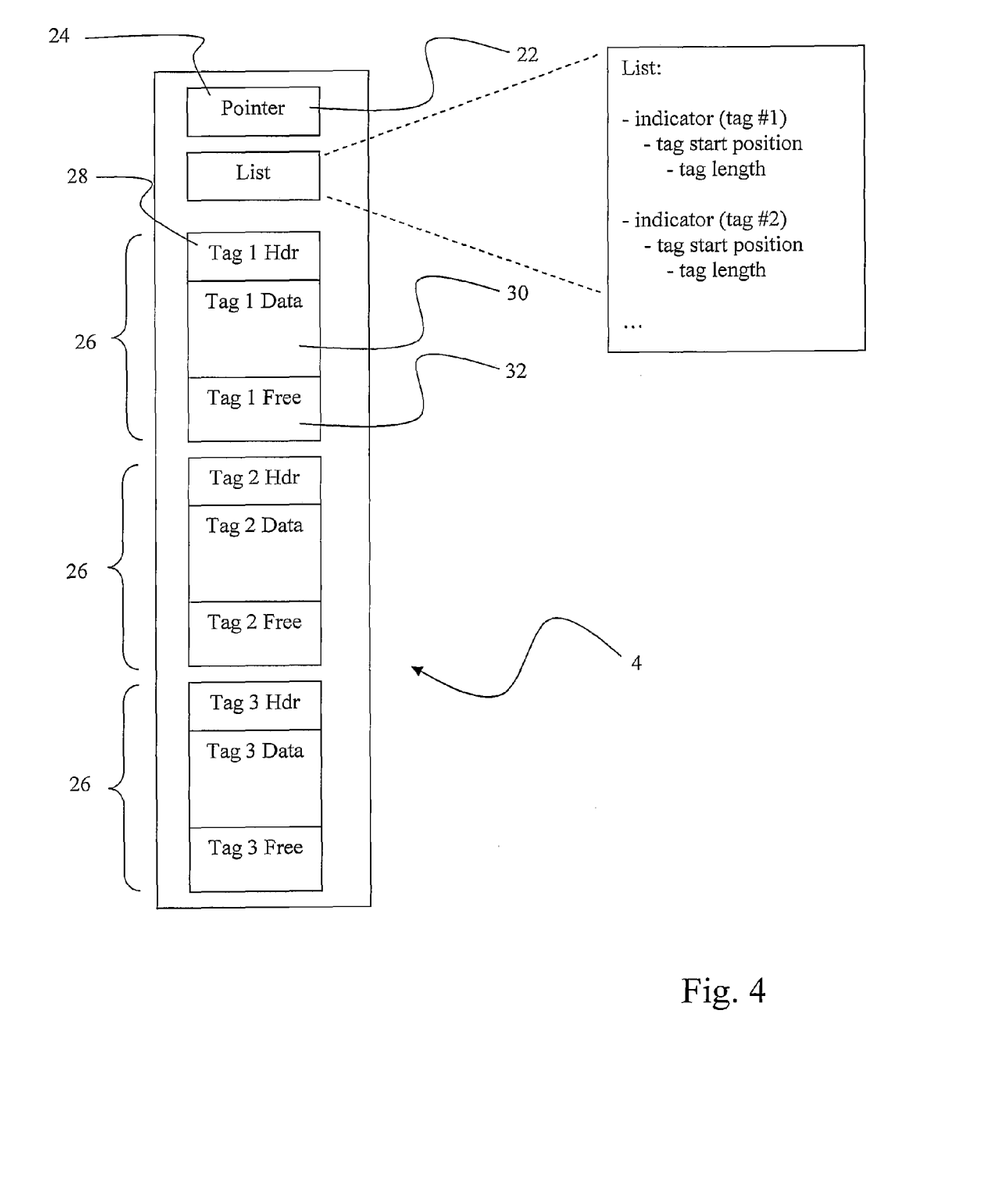
FIG. 4 shows a schematic view of the structure of the memory contents of an embodiment of the inventive device.

FIG. 4 shows a structure of the memory used in devices and methods of the present invention. The memory 4 (see also FIG. 3) in this case stores 3 data sets 26, referring to tags 1, 2 and 3. The memory further stores a list 24, which comprises an ordered list of the stored data sets 26. As has been shown on the right side of this figure, the list comprises for each tag at least an indicator (e.g. a number), the starting position of the tag within the memory 4, and the length of the tag (optionally also the maximum length of writeable tags). Starting position and length are parameters necessary to access the respective data necessary to configure the tag emulation circuit. That is, the list comprises all required management information enabling the controller to appropriately handle the tags.

Each data set 26 comprises a header section 28, a body section 30 and optionally a free section 32. The header section 28 defines the properties of the air interface of an RFID tag, that is, parameters like frequency, modulation, data rate, used protocol and the like. In the body section 30 the actual data content is stored, e.g. information of a railway ticket, access control or like. In this data section also data can be written/overwritten, in case the tag is writeable. In case the RFID tag described by the data set 26 is a tag the data content of which may be written to, the reserved free section 32 can be provided.

This enables the data content to be increased with respect to its size in case a write access occurs. The tag can be expanded during a writing operation without overwriting other tags. However, the dimension of this free section 32 also limits the maximum amount of data that can be written to this tag data set.

The invention claimed is:

1. Method comprising
  causing one or more data sets to be stored, wherein each data set defines operational properties, including a data payload, of a radio frequency identification (RFID) tag;
  causing a list of said one or more data sets to be maintained;
  indicating a first data set in said list as an active data set by causing a pointer indicating said first data set to be stored or by causing a previously stored pointer to be updated so as to indicate said first data set, the first data set defining a first data payload;
  receiving an interrogation from an RFID tag interrogation device;
  causing, responsive to said interrogation, the operation of the RFID tag to be emulated according to the active data set; and
  following the indication of the first data set as the active data set, automatically indicating a second data set in said list as the active data set by causing the pointer to be updated to indicate the second data set, the second data set defining a second data payload which is different from the first data payload;
  wherein only one data set in the list is indicated as the active data set at a time.

2. Method according to claim 1, wherein said second data set is the subsequent data set in said list.

3. Method according to claim 1, wherein said RFID tag interrogation device comprises writing capabilities, further comprising:
  receiving a write access from said RFID tag interrogation device;
  indicating, responsive to said write access, the previous data set in said list as active data set; and
  causing the active data set to be modified in accordance with said write access.

4. Method according to claim 3, wherein said previous data set is the precedent data set in said list.

5. Method according to claim 1, further comprising:
  indicating a pre-determined data set in said list as active data set.

6. Method according to claim 1, further comprising:
  causing the order of said data sets in said list to be rearranged.

7. Method according to claim 6, further comprising:
  causing a value indicating the frequentness one or more of said data sets have been active data sets to be maintained;
  wherein said re-arranging is caused to be performed in accordance with said value.

8. Method according to claim 6, further comprising:
causing a usage history comprising when the one or more data sets have been active data sets to be maintained;
wherein said re-arranging is performed in accordance with said usage history.

9. Method according to claim 6, further comprising:
receiving a user input indicating one of said data sets; and
causing said indicated data set to be rearranged within said list according to said user input.

10. Method according to claim 6, further comprising:
determining a type of one or more data sets based on said operational properties defined by said data sets; and
causing the order of said data sets to be rearranged in accordance with said type of one or more data sets.

11. Computer program product comprising a non-transitory computer readable storage medium containing program code portions, the program code portions being configured to, upon execution, cause an apparatus to at least:
cause storage of one or more data sets, wherein each data set defines operational properties, including a data payload, of a radio frequency identification (RFID) tag;
cause a list of said one or more data sets to be maintained;
indicate a first data set in said list as an active data set by causing a pointer indicating said first dataset to be stored or by causing a previously stored pointer to be updated so as to indicate said first data set, the first data set including a first data payload;
receive an interrogation from an RFID tag interrogation device;
cause, responsive to said interrogation, the operation of the RFID tag to be emulated according to the active data set; and
following the indication of the first data set as the active data set, automatically indicate a second data set in said list as the active data set by causing the pointer to be updated to indicate the second data set, the second data set including a second data payload which is different from the first data payload;
wherein only one data set in the list is indicated as the active data set at a time.

12. Computer program product according to claim 11, wherein said program code portions are executed in a processor in a computer or network device.

13. An apparatus, comprising:
a memory configured to store one or more data sets and a list of said one or more data sets, wherein each data set defines operational properties, including a data payload, of a radio frequency identification (RFID) tag, and wherein a stored pointer indicates a first data set in said list as an active data set, the first data set including a first data payload;
an RFID tag interrogation device;
a controller connected with said memory, wherein said controller is configured to:
be activated by an interrogation from the RFID tag interrogation device,
configure a circuit that is configured to emulate operations of an RFID tag according to said active data set, and
following the indication of the first data set as the active data set, automatically indicate a second data set within said list as the active data set by causing the stored pointer to be updated to indicate the second data set, the second data set including a second data payload which is different from the first data payload;
wherein only one data set in the list is indicated as the active data set at a time.

14. Apparatus according to claim 13, wherein said second data set is the subsequent data set in said list.

15. Apparatus according to claim 13, wherein said RFID tag interrogation device comprises writing capabilities, and wherein said controller is further configured to:
be activated by a write access by said RFID tag interrogation device, and
indicate the previous data set in said list as active data set, and
cause the active data set to be modified in accordance with said write access, responsive to said write access activation.

16. Apparatus according to claim 15, wherein said previous data set is the precedent data set in said list.

17. Apparatus according to claim 13, wherein each data set comprises:
a header section defining air interface properties of the RFID tag; and
a body section defining the data payload of said RFID tag.

18. Apparatus according to claim 13, implemented as an interface Application Specific Integrated Circuit (ASIC).

19. Mobile electronic device, comprising an apparatus according to claim 13, wherein said mobile electronic device is configured to cause a pre-determined data set to be indicated as active data set.

20. Mobile electronic device, comprising a device according to claim 13, wherein said mobile electronic device is configured to cause the order of said data sets to be rearranged in said list.

21. Mobile electronic device according to claim 20, wherein said mobile electronic device is configured to maintain a value indicating the frequentness said one or more of said data sets have been indicated as active data sets, and to cause said re-arranging in accordance with said value.

22. Mobile electronic device according to claim 20, wherein said mobile electronic device is configured to cause a usage history comprising when the one or more of said data sets have been indicated as active data sets to be maintained, and to cause said re-arranging in accordance with said usage history.

23. Mobile electronic device according to 20, wherein said mobile electronic device comprises user input means configured to receive a user input indicating one of said data sets, and wherein said mobile electronic device is configured to cause said re-arranging in accordance with said user input.

24. Mobile electronic device according to claim 20, wherein said mobile electronic device is configured to cause a type of one or more of said data sets to be determined based on said operational properties defined by said data sets, and to cause said re-arranging in accordance with said type.

25. An apparatus comprising:
a memory;
a radio frequency identification (RFID) tag interrogation device;
a controller configured to be activated by an interrogation from the RFID tag interrogation device, said controller also configured to receive an indication from the memory of an active data set from among a list of one or more data sets stored by the memory, said indication comprising a stored pointer indicating a first data set as the active data set, said controller further configured to configure a circuit that is operable to emulate the operation of an RFID tag according to the active data set that defines operational parameters, including a first data payload, of an RFID tag, said controller further configured to, following receiving the indication of the first data set as the active data set, automatically indicate a second data set within said list as the active data set by causing the stored pointer to be updated to indicate the second data set, wherein the second data set includes a second data payload which is different from the first data payload and only one data set in the list is indicated as the active data set at a time.

26. An apparatus according to claim 25, wherein said second data set is the subsequent data set in said list.

27. An apparatus according to claim 25, wherein said RFID tag interrogation device comprises writing capabilities, and wherein said controller is further configured to:
   be activated by a write access by said RFID tag interrogation device,
   indicate the previous data set in said list as active data set, and
   cause the active data set to be modified in accordance with said write access, responsive to said write access activation.

28. An apparatus according to claim 27, wherein said previous data set is the precedent data set in said list.

29. An apparatus according to claim 25, wherein each data set comprises:
   a header section defining air interface properties of an RFID tag; and
   a body section defining the data payload of said RFID tag.

30. An apparatus according to claim 25, implemented as an interface Application Specific Integrated Circuit (ASIC).

* * * * *

UNITED STATES PATENT AND TRADEMARK OFFICE
CERTIFICATE OF CORRECTION

PATENT NO.        : 8,410,908 B2          Page 1 of 1
APPLICATION NO. : 12/159172
DATED             : April 2, 2013
INVENTOR(S)       : Pendlebury et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1004 days.

Signed and Sealed this

First Day of September, 2015

Michelle K. Lee
*Director of the United States Patent and Trademark Office*